May 15, 1956   J. A. PICHARDO   2,745,751
FOOD PACKAGE KIT
Filed Oct. 20, 1952

INVENTOR.
JULIO A. PICHARDO
BY
ATTORNEY

United States Patent Office 2,745,751
Patented May 15, 1956

2,745,751

FOOD PACKAGE KIT

Julio A. Pichardo, New York, N. Y.

Application October 20, 1952, Serial No. 315,731

1 Claim. (Cl. 99—171)

This invention relates to a unique food packaging unit that is especially adapted for use in packaging beverages having a multiplicity of ingredients which can be transported in powder form, such as coffee.

Prior packaging practices have utilized separate containers for powdered coffee, powdered milk, and sugar in quantities so large as to require measuring of each ingredient on the part of the ultimate consumer.

Accordingly, it is an object of this invention to provide a package containing the ingredients necessary for the preparation of a beverage without requiring the measurement of individual portions.

Another object of this invention is to provide a package containing the ingredients required for a desired beverage wherein the amount of the ingredients contained therein are premeasured.

A further object of this invention is to provide a prearranged package of the type disclosed containing ingredients in powdered form wherein the amount of ingredients contained in the package is sufficient for a single portion and may be withdrawn from the package in preselected amounts according to individual tastes.

For further comprehension of the invention and of the objects and advantages thereof, reference will be had to the following description and accompanying drawings, and to the appended claim in which the various novel features of the invention are more particularly set forth.

In the accompanying drawings forming a material part of this disclosure:

For purposes of explanation, the following typical embodiments of the present invention will be described in detail. It will be understood, however, that the scope of the present invention is not to be limited to the specific details of the specific embodiments described herein, but rather, to the scope of the appended claim.

Figure 1:
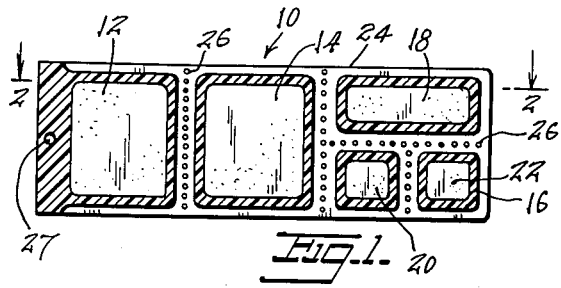
Fig. 1 is a horizontal sectional view of one embodiment of the invention taken along the lines 1—1 of Fig. 2.
Figure 2:
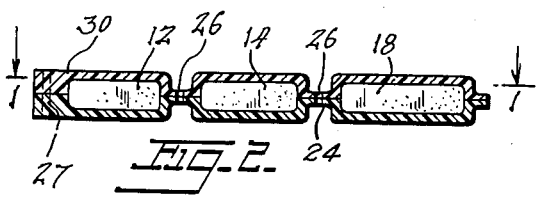
Fig. 2 is a vertical sectional end view of the embodiment shown in Fig. 1 taken along the lines 2—2 of Fig. 1.

A typical embodiment of the invention is shown in Figs. 1 and 2, wherein reference numeral 10 depicts a package especially suitable for packaging powdered ingredients necessary for an individual serving of coffee. Package 10 which can be made of any moisture-protective material such as plastic, cellophane or metal foil comprises three hermetically sealed compartments 12, 14 and 16.

Compartment 12 is provided with sufficient powdered coffee for one serving, compartment 14 with sufficient powdered milk or cream for one serving and compartment 16 is further sub-divided into sub-compartments 18, 20 and 22 which are hermetically sealed from each other in the manner provided for separating the compartments 12, 14 and 16. Sub-compartment 18 contains one teaspoonful of sugar or its equivalent in saccharine or other sweetening and subcompartments 20 and 22 contain each a half-teaspoonful of sugar or its equivalent.

The walls of the compartments and sub-compartments are interconnected via portions 24 of the same material as the package 10. These portions 24 are provided with perforations 26, thereby facilitating the removal and individual opening of any desired compartment or sub-compartment.

In practice, compartment 12 containing powdered coffee is removed from package 10 by tearing along perforations 26. Then, the compartment is torn open by the fingers of the person preparing the beverage and the contents poured into a container. Hot or boiling water is then poured into the container and powdered milk or cream is obtained from compartment 14 by tearing the latter and removing its contents. The amount of sugar to be added depends upon the taste of the drinker. Accordingly, it is possible with the arrangement shown for a person to add ½, 1, 1½ or 2 teaspoons of sugar or their equivalents by removing the contents of one or more sub-compartments 18, 20 and 22.

Figure 3:
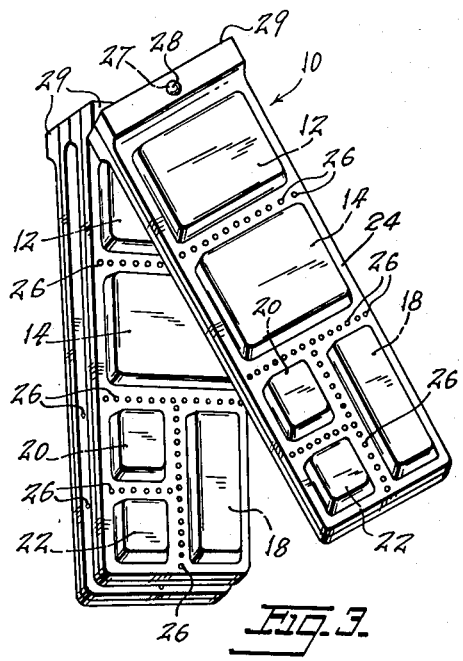
Fig. 3 is a perspective view showing how a plurality of packages such as shown in Figs. 1 and 2 may be packaged commercially.

Fig. 3 illustrates a commercially feasible way of packaging a multiplicity of individual portions each included in an individual package 10. In order to accomplish this objective, a hole 27 may be punched in the wall of an end chamber 12 preferably near the center at the longitudinal edge of each package 10.

A securing means 28 such as an eyelet is then passed through the holes 27 of the individual portion packages. An alternative method of securing packages together comprises the use of a staple as the securing element 28. Of course, the end portion 29 of the wall of chamber 12 is made much thicker than the rest of the wall in order to provide for the application of securing elements.

Figure 4:
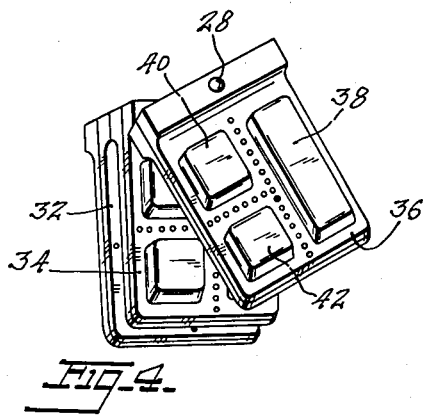
Fig. 4 is a perspective view of another embodiment of the present invention.

In Fig. 4 an alternate embodiment of the device shown in Figs. 1 and 2 is presented. In this embodiment, package 32 contains powdered coffee, package 34 powdered cream or milk, and package 36 three compartments of sugar, 38, 40 and 42 which may be similar in structure and contents to sub-compartments 18, 20 and 22 contained in the first described embodiment. These packages are secured together by means of a securing element 28 such as the eyelet or staple included in the Fig. 3 embodiment. The upper end of the walls of packages 32, 34 and 36 are thickened in the manner necessary for attachment similar to that shown in the first embodiment.

Figure 5:
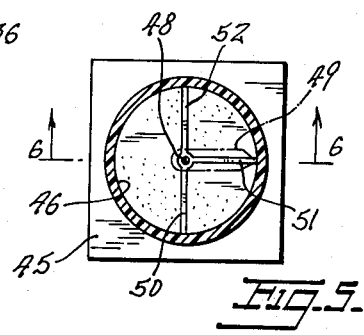
Fig. 5 is a horizontal sectional view of an alternate means for measuring out one of the ingredients contained in the beverage according to the tastes of the consumer taken along the lines 5—5 of Fig. 6.
Figure 6:
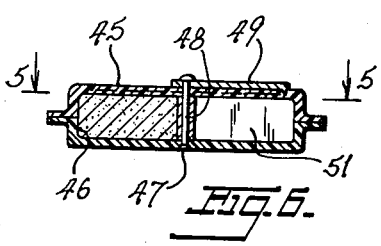
Fig. 6 is a vertical sectional view of the means depicted in Fig. 5 taken along the lines 6—6 of that drawing.

In Figs. 5 and 6 is disclosed an alternate sugar compartment to be used with any of the embodiments disclosed hereinabove. In this embodiment, compartment or package 45 is provided with a circular inner wall 46 having a thickness that extends from the floor to the roof of the compartment and a pivot pin 47 at the origin of the circle defined by wall 46. A rotatable shaft 48 is connected at one end of its longitudinal rotational axis to the bearing at one flat side of compartment 45 and a pointer 49 is rigidly connected to the other end of the shaft at the opposite flat side of the compartment in the manner shown in Figs. 5 and 6.

Figure 7:
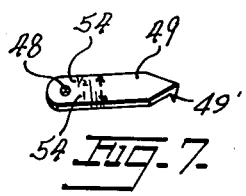
Fig. 7 is a perspective view showing the details of an element in the embodiment depicted in Figs. 5 and 6.

Extending radially from shaft 48 to the circular wall 46 are three radial ribs 50, 51 and 52, which separate the compartment 46 into three sub-compartments that contain 1 teaspoon, ½ teaspoon and ½ teaspoon of sweetening as provided in the embodiment of Fig. 1. These ribs are mechanically coupled to the shaft 48 so that the ribs rotate with the pointer 49 as the latter is rotated. The latter is aligned with rib 52 separating the sub-compartment containing one teaspoon from one of the sub-compartments containing ½ teaspoon. By providing indicia 54 on the upper face of the pointer as shown in Fig. 7, it is possible to tear a corner off the compartment 46, spill out the contents of the desired amount and then if additional sugar is desired, the pointer is rotated, thereby aligning an additional sub-compartment with the opening torn in the wall of compartment 46. Perforations may be provided for guiding the tearing action to insure that the proper amount of corner is torn off.

It is understood that while the perforations are shown in the drawings that these are not absolutely necessary, but may be provided in order to facilitate the separation of the component ingredients.

The individual portion packages are susceptible to mass production methods by conveying strips of metal foil or celluloid preformed to provide the lower half of compartments 12, 14 and 16 as shown in Figs. 1 and 2 along a conveyor belt. As each lower half comes into alignment with a battery of powdered ingredient dispensing machines, the conveyor comes to a momentary halt and the individual dispensing machines dispense metered quantities of powdered coffee, powdered milk and sugar, for example, to the associated compartments. Then, a cover which is the mirror image of the bottom half is applied to the bottom half and the two halves are sealed, either by heat sealing or by pressure sealing.

A stamping machine may be provided if perforations are desired.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

A package unit for providing individual portions of powdered sugar comprising an annular compartment having spaced top and bottom walls containing powdered sugar, a shaft extending axially through said top and bottom walls, means associated with the shaft for partitioning the compartment, a pointer rigidly mounted on said shaft above the annular compartment and radially thereto, and a sharp point on the free end of said pointer engaging the top wall whereby rotation thereof will tear the annular compartment along its peripheral edge, said partitioning means consisting of radial ribs on the shaft extending into said compartment to subdivide the compartment, said ribs being rotatable with the pointer as it is rotated to expose the subcompartments successively into view.

References Cited in the file of this patent

UNITED STATES PATENTS

| | | |
|---|---|---|
| 1,576,088 | Bunz | Mar. 9, 1926 |
| 1,931,765 | Leever | Oct. 24, 1933 |
| 2,073,635 | Holoubek | Mar. 16, 1937 |
| 2,096,825 | Roman | Oct. 26, 1937 |
| 2,211,816 | Heise | Aug. 20, 1940 |
| 2,245,738 | Taylor | June 17, 1941 |
| 2,271,156 | Walker | Jan. 27, 1942 |